Dec. 4, 1956 J. A. MORRISON 2,773,143
TRACTOR IGNITION SYSTEM
Filed Jan. 19, 1953 2 Sheets-Sheet 1
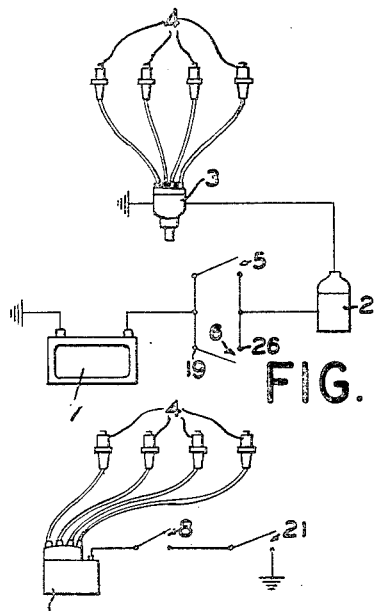
FIG. 1
FIG. 1A
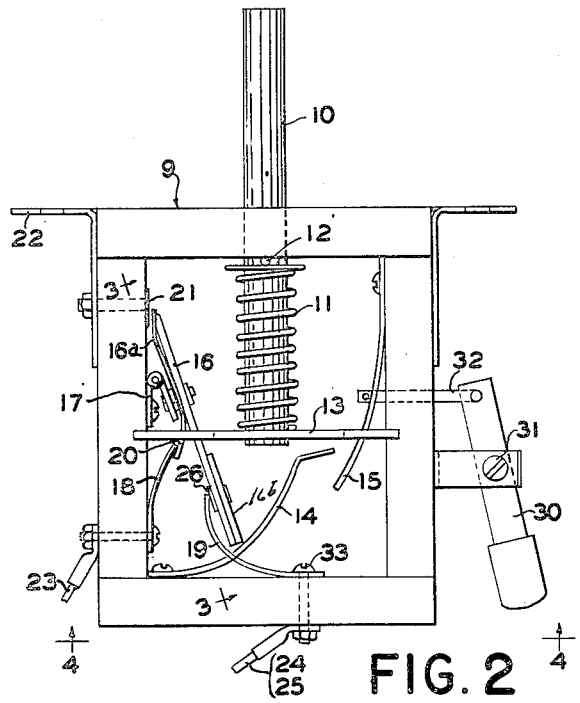
FIG. 2
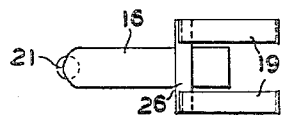
FIG. 3
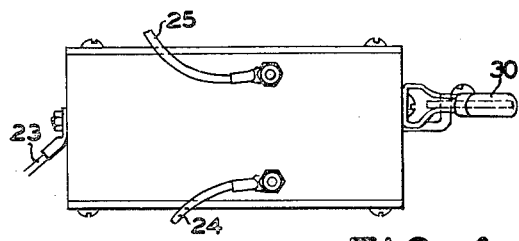
FIG. 4
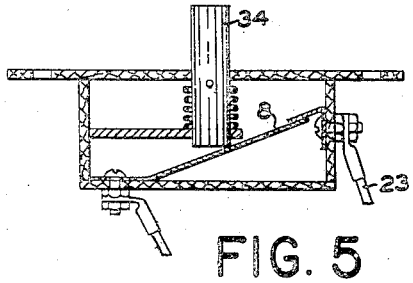
FIG. 5
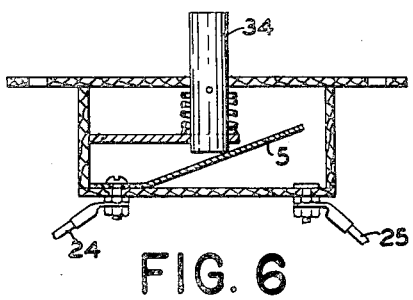
FIG. 6
*INVENTOR.*
JAMES A. MORRISON
BY
Merrill M. Blackburn.
ATTORNEY Dec. 4, 1956     J. A. MORRISON     2,773,143
TRACTOR IGNITION SYSTEM Filed Jan. 19, 1953     2 Sheets-Sheet 2

*INVENTOR.*
JAMES A. MORRISON
BY
Merrill M. Blackburn.
ATTORNEY 2,773,143

TRACTOR IGNITION SYSTEM

James A. Morrison, Washington, Iowa

Application January 19, 1953, Serial No. 331,866

2 Claims. (Cl. 200—61.58)

My present invention relates to the combined automatic and manual control of the functioning of a motor-driven vehicle, especially a tractor, although not necessarily limited thereto.

Among the objects of this invention are the provision of a mechanism which will insure the stopping of a tractor if the driver falls from the seat thereof; the provision of a mechanism of the character described such that it is possible to continue the operation of the vehicle, when desired, even though the operator leaves his seat intentionally; the provision of a structure of the character described which may be caused to continue operation, if the operator stands up on the machine and does not occupy the seat; the provision of switches which can be used with a circuit involving the use of a magneto or a battery with equal facility and equal operability; and such further objects, advantages, and capabilities as will hereinafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 shows a simplified control circuit including the switch shown in Figs. 2, 6, 7, and 8, and the switch shown in Figs. 6 and 11;

Fig. 1a shows a simplified circuit for use with a magneto, including the use of a switch shown in Figs. 5, 10, and 11;

Figure 7:
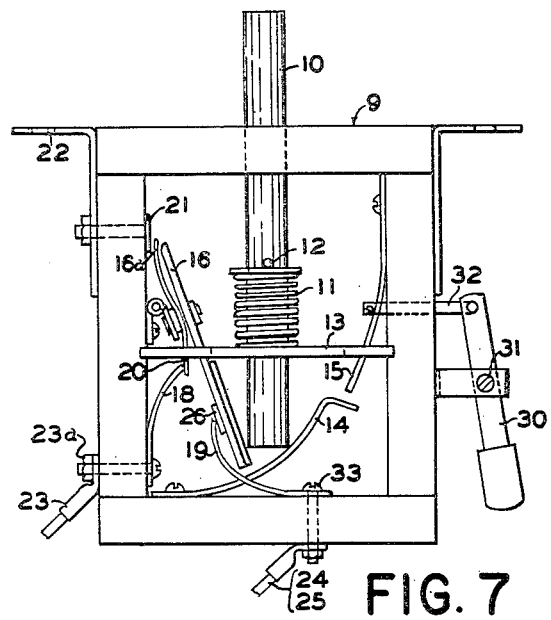
Figure 8:
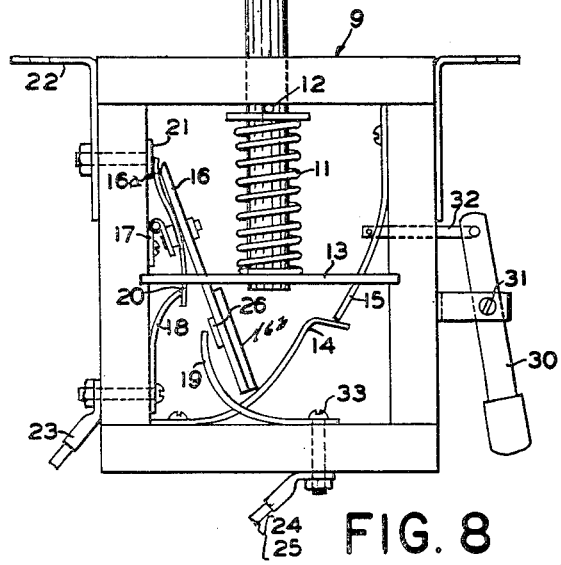
Figure 9:
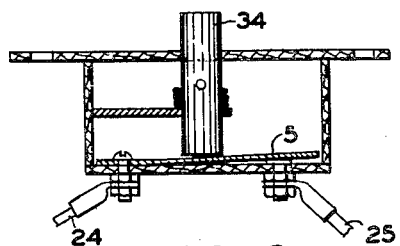
Figure 12:
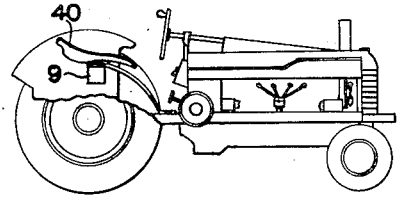
Figure 10:
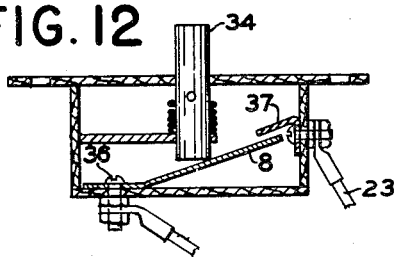
Figure 11:
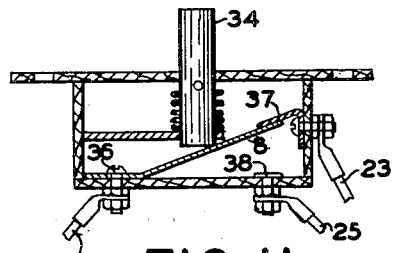

Figs. 2, 7, and 8 show a switch, in different operative positions, used in the circuit of Fig. 1 or Fig. 1a;

Fig. 3 shows a part of the switch shown in Fig. 2 and related figures;

Fig. 4 shows an underside view of the switch shown in Fig. 2;

Figs. 5, 10, and 11 show a floor board switch in different operative positions;

Figs. 6, 9, and 11 show the floor board switch used for controlling a battery circuit; and Fig. 12 is an elevation of a tractor showing a seat to which a switch box is connected.

In the circuit of Fig. 1, there is a battery 1, a coil 2, a distributor 3, and spark plugs 4, as same would be seen if disconnected from a tractor. There is also a switch 5 and a switch 6, corresponding, respectively, to the switches shown in Fig. 6 and Fig. 5.

In Fig. 1a, the spark plugs are designated by the numeral 4, and the magneto, which takes the place of the battery 1, coil 2, and distributor 3, is denoted by the numeral 7, while the numeral 8 denotes the floor board switch shown in Fig. 5.

In this present construction, contrary to that shown in my Patent No. 2,612,232, issued September 30, 1952, there are no moving wires. In the present construction, the box 9, made of non-conductive material, is attached to the underside of the seat 40, is movable and, when the operator sits down on the seat, it moves downwardly and depresses the plunger 10, as shown in the above mentioned patent. When the operator gets off the seat, the plunger 10 is returned to its upper position by the spring 11. A pin 12, extending through the plunger 10, serves to cause this plunger to move with the spring. A supporting cross-bar 13 of insulating material connects opposite sides of the box 9 and has the plunger 10 extending therethrough. The second end of the spring 11 rests on this cross-bar.

A spring 14, secured to the underside of the box 9, forms no part of the electrical circuit. When the plunger 10 goes down, it presses the spring 14 down and to the right, and the end of this spring is engaged under the resilient latch member 15. This holds the spring 14 down so that it does not press against the end of non-conducting, pivoted element 16. A hinge 17 supports the element 16, pivotally, and allows it to be pushed up by a spring 18 which bears against a spring 20, secured to the pivoted element 16. The spring 20 is secured by the hinge 17 to the pivoted element 16. This may cooperate with a contact 21 and bracket 22, which is electrically connected to the frame of the machine and is thereby grounded. A pair of springs 19 are connected to leads 24 and 25, as shown in Fig. 4. A contact bar 26 is carried by the pivoted element 16, and may or may not connect the springs 19, as shown in Fig. 7 and Fig. 8.

A lever 30, pivoted at 31, has a link 32 pivotally connected thereto, and the link 32 is connected to the spring 15 so that this spring may be pulled back from the spring 14 when it is desired that the two shall not contact, thus letting spring 14 go up to cause closing of the switch at 26, thus connecting the wires 24, 25. When the operator sits down on the seat, the plunger 10 is pushed down and engages the spring 14, which is pushed over at the bottom so that the contact bar 26 closes the circuit between the springs 19. Since the springs 19 are held in place by bolts 33 which are connected to the lead wires 24 and 25, the circuit is closed between these lead wires, and the circuit of Fig. 1 is closed. If the operator gets up from the seat or is thrown off from the tractor for any reason, the plunger 10 rises, as shown in Fig. 2, and spring 14 engages the end of spring 15, as shown in Fig. 8, and does not close the switch 24, 25, and 26. The spring contact 18 forces the pivoted element 16 and contact bar 26 away from the springs 19, and the contact is then broken between the springs 19. Since the power circuit to the tractor is broken, the tractor stops unless the operator does something to close the circuit. This he can do by pushing inwardly on the lever 30, which pulls the spring 15 out of stopping position, as shown in Fig. 2.

When the operator of the tractor gets up from the seat, the spring 11 can expand, as shown in Fig. 8. With spring 14 held down by spring 15, as shown in Fig. 8, contact bar 26, carried by pivoted element 16, does not engage the springs 19 to bridge the gap between the spring contacts 19, but when the seat is again depressed this closes the circuit between the lead wires 24 and 25, and the circuit now acts as a normal closed circuit. As explained above, when the operator of the tractor gets up from his seat, without pressing on the lever 30, the spring 14 does not go all the way up, and the gap between the springs 19 is not closed. Hence, the circuit between the lead wires 24 and 25 is a broken circuit. If spring 14 is held down by spring 15, the spring contact 20 is forced out by spring 18 until the switch element 16a engages the contact 21. If the magneto circuit is not in use, the contact 21 is a dead contact, and closing the gap between the contact 21 and the spring 20 has no effect. If the battery circuit is in use, the rising of the plunger 10 causes the spring 14 to press outwardly against the insulating pad 16b on the pivoted element 16, and this has a tendency to force the pivoted element 16 down and to the left, as seen in Fig. 7. This brings the contact 26 into bridging position with relation to the spring contacts 19, which closes the switch 6, and therefore closes the circuit through the conductors 24 and 25.

If the switch of Figs. 2, 7, and 8 is to be used with a circuit having a battery, as in Fig. 1, the distributor 3 is connected to a coil 2, the circuit to the terminals 33 of Fig. 2, the terminals 33 to the lead wires 24 and 25 of Figs. 2 and 4, and the switches 5 and 6 of Fig. 1 to the battery. Switches 5 and 6 are connected in parallel, and are referred to in Figs. 2, 6, 7, and 8 as 5, 19, 26. Hence, switch 19, 26, comprising springs and contact bar, will be connected in parallel with switch 5 of Fig. 1. Therefore, switch 19, 26 will be closed when the operator sits on the seat, which results in the plunger 10 being depressed and the closure of switch 19, 26. Switch 5 is a floor-board switch and is closed only as a result of the operator placing his foot on plunger 34 and pressing down. This causes switch 5 to be closed in event the operator wishes the engine to keep running, even though he gets up from the seat, thus permitting switch 19, 26 to open.

If the tractor is magneto operated, the distributor, the coil, and the battery are replaced by the magneto, and the switch or spring element 16a is grounded by being connected to the ground contact 21. The wire 23 is connected to the contact or binding post 23a and the spring contact 18. Therefore, when the operator sits down on the seat, the plunger 10 is depressed, with the result that the switch 16a is opened, permitting the operation of the motor. If the operator is thrown from his seat or gets off from it, closure of the switch 8 or 16a results in grounding the magneto circuit and stopping the running of the motor.

In the structure of Fig. 11, floor board switch 8 is held by the binding post 36 and cooperates, at its free end, with contact 37 which is in circuit with lead wire 23. A binding post 38 is dead but may be put into circuit by closing switch 8, lead wire 25 being connected with the post 38. If the battery circuit is used, the lead wire 25 will be connected to the binding post 38. Then, by pushing down on the floor board switch 8, the circuit will be closed, permitting the circuit to the motor to cause operation of the motor by the battery. Hence, by using the two switches 19 and 26 and 8, 37, 38, the operator may use either battery or magneto for the operation of his engine.

It is of course understood that the specific description of structure set forth above may be departed from without departing from the spirit of this invention as disclosed herein and as defined by the appended claims.

Having now described my invention, I claim:

1. In a tractor having a seat, an electric circuit comprising switches, a plunger for operation of one of the switches, said switches comprising a box secured under the seat, a lever mounted on a side of the box, a link extending through the side of the box, a holding spring in the box, the link being connected to the spring, a second spring in the box adapted to be engaged by the first mentioned spring, when the second mentioned spring is flexed into the path of the first mentioned spring, the second spring being released from the first spring when the lever is moved, a pair of contacts mounted in the box on the same side of the box as the second spring, and a lever pivotally mounted on a third side of the box, within the box, the lever carrying a bridging contact which may close the circuit between the two contacts, the bridging contact being forced into engagement with the two contacts, when the second spring is released by operation of the first spring.

2. For use in a tractor motor circuit, a box, switches contained in said box, a lever carried by one side of said box and carrying two switches, said lever, in one position, closing one of said switches, and in another position closing the other of said switches, and a plunger movable in said box for shifting said lever, said plunger, on being actuated, moving said lever into said second position, said structure including a spring stop, a lever mounted on said box, a link extending through a wall of said box to engage a spring on the inside thereof, a spring mounted on the inside of said wall, and a second spring mounted on a second wall of said box, said second spring being held by the first spring in actuated position.

References Cited in the file of this patent

UNITED STATES PATENTS

| | | |
|---|---|---|
| 1,956,978 | Nafziger | May 1, 1934 |
| 2,219,337 | Schenedorf | Oct. 29, 1940 |
| 2,469,976 | Miller | May 10, 1949 |
| 2,499,958 | Knowlton | Mar. 7, 1950 |
| 2,521,005 | Gundlach | Sept. 5, 1950 |
| 2,573,514 | Turner | Oct. 30, 1951 |
| 2,577,960 | Ginard | Dec. 11, 1951 |
| 2,579,135 | Alexander | Dec. 18, 1951 |
| 2,612,232 | Morrison | Sept. 30, 1952 |